United States Patent
Ichikawa et al.

(10) Patent No.: US 9,863,846 B2
(45) Date of Patent: Jan. 9, 2018

(54) TRANSMISSION TESTING DEVICE AND TRANSMISSION TESTING METHOD

(71) Applicants: Fumihiko Ichikawa, Miyoshi (JP); Yoshinori Miura, Toyota (JP); Yuusuke Nishizawa, Miyoshi (JP)

(72) Inventors: Fumihiko Ichikawa, Miyoshi (JP); Yoshinori Miura, Toyota (JP); Yuusuke Nishizawa, Miyoshi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 402 days.

(21) Appl. No.: 14/653,327

(22) PCT Filed: Oct. 31, 2013

(86) PCT No.: PCT/JP2013/079590
§ 371 (c)(1),
(2) Date: Jun. 18, 2015

(87) PCT Pub. No.: WO2014/103506
PCT Pub. Date: Jul. 3, 2014

(65) Prior Publication Data
US 2015/0346055 A1    Dec. 3, 2015

(30) Foreign Application Priority Data
Dec. 27, 2012   (JP) .................. 2012-284080

(51) Int. Cl.
*G01M 13/02* (2006.01)
*F16H 48/32* (2012.01)
*F16H 48/08* (2006.01)

(52) U.S. Cl.
CPC .......... *G01M 13/025* (2013.01); *F16H 48/32* (2013.01); *G01M 13/022* (2013.01); *F16H 48/08* (2013.01)

(58) Field of Classification Search
CPC .................... G01M 13/025; G01M 13/022
USPC ....................................... 73/115.02
See application file for complete search history.

(56) References Cited

U.S. PATENT DOCUMENTS

| | | | |
|---|---|---|---|
| 4,093,052 | A | 6/1978 | Falk |
| 2013/0239400 | A1* | 9/2013 | Yokoyama ............ B23B 31/202 29/558 |

FOREIGN PATENT DOCUMENTS

| | | |
|---|---|---|
| JP | 62-40567 B2 | 8/1987 |
| JP | 4-364438 A | 12/1992 |
| JP | 6-63918 B2 | 8/1994 |
| JP | 10-142103 A | 5/1998 |
| JP | 2007-40787 A | 2/2007 |

(Continued)

*Primary Examiner* — Walter L Lindsay, Jr.
*Assistant Examiner* — Philip Marcus T Fadul
(74) *Attorney, Agent, or Firm* — Sughrue Mion, PLLC

(57) ABSTRACT

A transmission testing device that performs tests to verify transmission functionality has: an output shaft directly or indirectly coupled to a differential gear section of the transmission; a rotary driving unit for rotating the output shaft; and a cylindrical meshing unit comprising a meshing portion to mesh with a side gear of the differential gear section, and a chuck portion in which a fluid circuit is formed. The meshing unit is fixed to a differential case of the differential gear section by way of expanding the chuck portion in the radial direction of the chuck portion by applying pressure to the fluid in the fluid circuit.

8 Claims, 6 Drawing Sheets

(56) References Cited

FOREIGN PATENT DOCUMENTS

JP    2010-91072 A    4/2010

* cited by examiner

TRANSMISSION TESTING DEVICE AND TRANSMISSION TESTING METHOD

CROSS REFERENCE TO RELATED APPLICATIONS

This is a national phase application filed under 35 U.S.C. 371 of PCT/JP 2013/079590 filed on Oct. 31, 2013, which claims the benefit of priority from the prior Japanese Patent Application No. 2012-284080 filed on Dec. 27, 2012, the entire contents of all of which are incorporated herein by reference.

TECHNICAL FIELD

The present invention relates to a transmission testing device and a transmission testing method for carrying out a test for verifying functionality of a transmission in a vehicle manufacturing process and others.

BACKGROUND ART

Patent Document 1 discloses a testing device for a transmission of a vehicle used in a production line and others. In the transmission testing device disclosed in Patent Document 1, the transmission is connected to an input shaft for applying input rotation to the transmission and connected to two output shafts corresponding to left and right driving wheels. In the transmission testing device of Patent Document 1, the input rotation is applied to the transmission by a direct current motor via the input shaft to thereby carry out various tests on the transmission.

RELATED ART DOCUMENTS

Patent Documents

Patent Document 1: JP-A-04(1992)-364438

SUMMARY OF INVENTION

Problems to be Solved by the Invention

The testing device of Patent Document 1 is provided with many components such as a motor, a torquemeter, and a disc brake disposed in correspondence with each of the two output shafts. The testing device of Patent Document 1 hence involves high cost and increase in size of the device.

Further, when an object to be tested is a transaxle transmission having a transmission mechanism and a differential gear section, two output shafts are considered to be connected to two side gears of the differential gear section. Then, in order not to generate a difference in motion between the two output shafts, it is necessary to control the number of rotations of the motors, which are respectively connected to the two output shafts, and to accurately synchronize the number of rotations of the two output shafts. For the accurate synchronization of the number of rotations of the two output shafts, expensive motors for exclusive use for the testing device need to be prepared and connected to the two output shafts. Therefore, the transmission testing device disclosed in Patent Document 1 leads to further cost increase to enable testing of the transaxle transmission.

The present invention has been made to solve the above problem and has a purpose to provide a transmission testing device and a transmission testing method for carrying out a test for verifying functionality of a transmission with achieving cost reduction.

Means of Solving the Problems

To achieve the above purpose, one aspect of the invention provides a transmission testing device for carrying out a test for verifying functionality of a transmission, wherein the transmission testing device includes: an output shaft configured to be directly or indirectly connected to a differential gear section of the transmission; a rotation driving unit for rotating the output shaft; and a cylindrical meshing unit including a meshing part configured to be meshed with a side gear of the differential gear section and a chuck part formed inside with a fluid circuit, and the meshing unit is fixed to a differential case of the differential gear section in such a way that the chuck part is expanded in a radial direction of the chuck part when pressure is applied to a fluid in the fluid circuit.

According to the above aspect, the test for verifying the functionality of the transmission can be carried out with the single output shaft without considering the difference in motion between the two output shafts like the prior arts. Therefore, one rotation driving member for the output shaft is sufficient. Accordingly, the test for verifying the functionality of the transmission can be carried out with achieving cost reduction. Further, size reduction in the transmission testing device can be achieved.

In the above aspect, preferably, the differential gear section includes a first side gear and a second side gear, the meshing part is meshed with the first side gear, and the output shaft is connected to the second side gear.

According to the above aspect, since the first side gear is fixed with the differential case, force input from an input part of the transmission is transmitted one-to-one to the second side gear. Namely, there is no difference in motion between the first side gear and the second side gear. Thus, the transmission can be driven by the single rotation driving member for the output shaft. This makes it possible to carry out the test for verifying the transmission functionality with achieving more confident cost reduction.

In the above aspect, preferably, the meshing unit is formed on an outer circumferential surface of the chuck part with a blower hole for discharging gas.

According to the above aspect, the gas is discharged or fed outside through the blower hole so that the oil adhering to the differential case is blown away, and hence the meshing unit is hard to slip with the differential case.

In the above aspect, preferably, the chuck part will hold an inner surface of the differential case when the chuck part is expanded in the radial direction of the chuck part, and the gas is discharged through the blower hole and blown against the inner surface of the differential case before the chuck part holds the inner surface of the differential case or when the chuck part holds the inner surface of the differential case.

According to the above aspect, in the differential case, the oil adhering to the surface held by the chuck part can be swept away, so that the meshing unit can be surely fixed to the differential case.

Another aspect of the present invention to achieve the above purpose is to provide a transmission testing method of carrying out a test for verifying functionality of a transmission, wherein the testing method employs: an output shaft configured to be directly or indirectly connected to a differential gear section of the transmission; a rotation driving unit for rotating the output shaft; and a cylindrical meshing unit including a meshing part configured to be meshed with a side gear of the differential gear section and a chuck part formed inside with a fluid circuit, and the method includes fixing the meshing unit to a differential case of the differential gear section by applying pressure to a fluid in the fluid circuit so that the chuck part is expanded in a radial direction of the chuck part.

According to the above aspect, the test for verifying the functionality of the transmission can be carried out with the single output shaft without considering the difference in motion between the two output shafts like the prior arts. Therefore, one rotation driving member for the output shaft is sufficient. Accordingly, the test for verifying the functionality of the transmission can be carried out with achieving cost reduction. Further, size reduction in the transmission testing device can be achieved.

In the above aspect, preferably, the differential gear section includes a first side gear and a second side gear, the meshing part is meshed with the first side gear, and the output shaft is connected to the second side gear.

According to the above aspect, since the first side gear is fixed with the differential case, force input from an input part of the transmission is transmitted one-to-one to the second side gear. Namely, there is no difference in motion between the first side gear and the second side gear. Thus, the transmission can be driven by the single rotation driving member for the output shaft. This makes it possible to carry out the test for verifying the transmission functionality with achieving more confident cost reduction.

In the above aspect, preferably, the meshing unit is formed on an outer circumferential surface of the chuck part with a blower hole for discharging gas.

According to the above aspect, the gas is discharged or fed outside through the blower hole so that the oil adhering to the differential case is swept away, and hence the meshing unit is hard to slip with the differential case.

In the above aspect, preferably, the chuck part will hold an inner surface of the differential case when the chuck part is expanded in the radial direction of the chuck part, and the gas is discharged through the blower hole and blown against the inner surface of the differential case before the chuck part holds the inner surface of the differential case or when the chuck part holds the inner surface of the differential case.

According to the above aspect, in the differential case, the oil adhering to the surface held by the chuck part can be swept away, so that the meshing unit can be surely fixed to the differential case.

EFFECTS OF THE INVENTION

According to the transmission testing device and the transmission testing method of the present invention, a test for verifying the functionality of the transmission can be carried out with achieving cost reduction.

MODE FOR CARRYING OUT THE INVENTION

Figure 1:
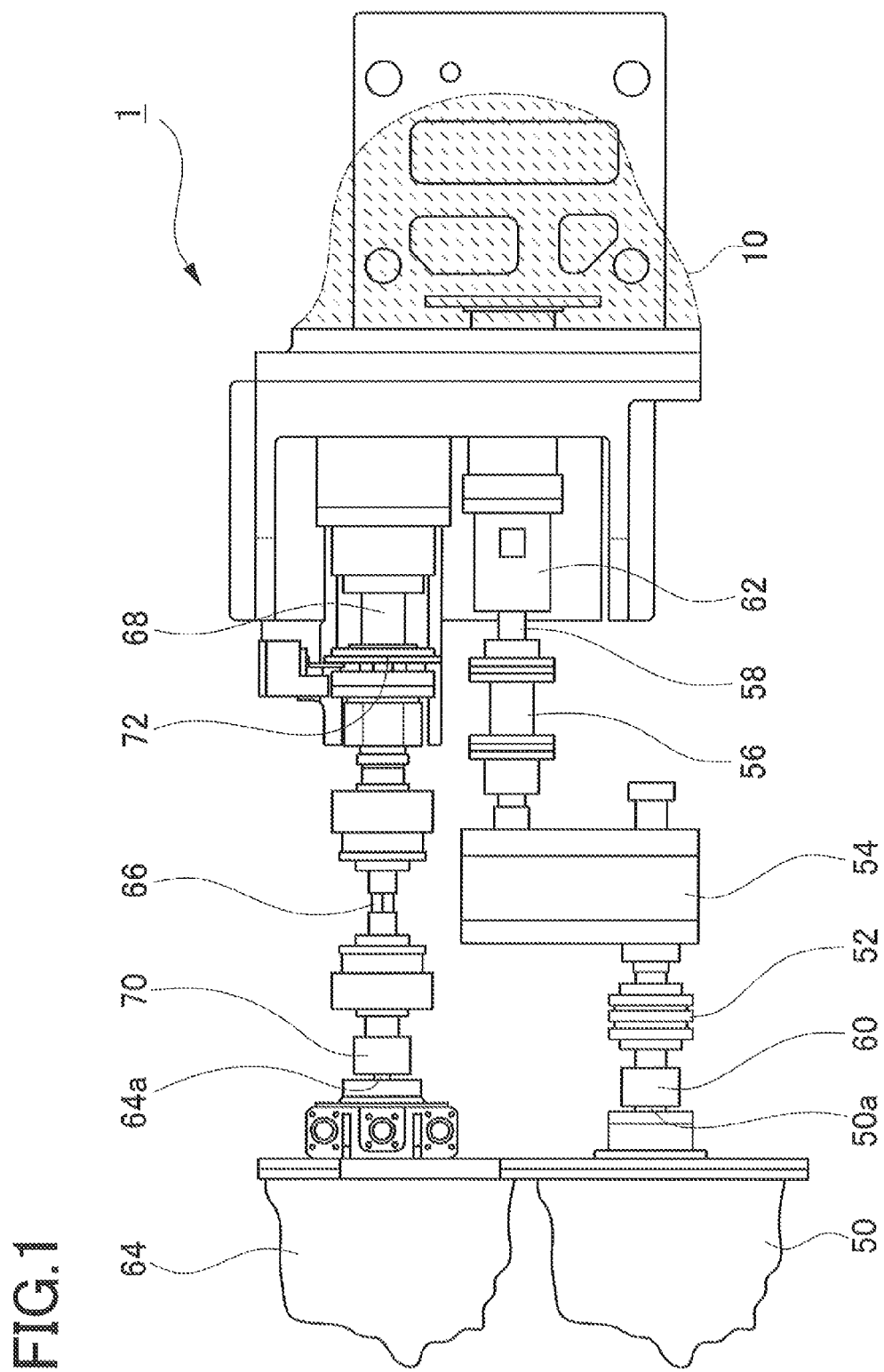
FIG. 1 is a plan view of a transmission assembly tester of the present embodiment.
Figure 2:
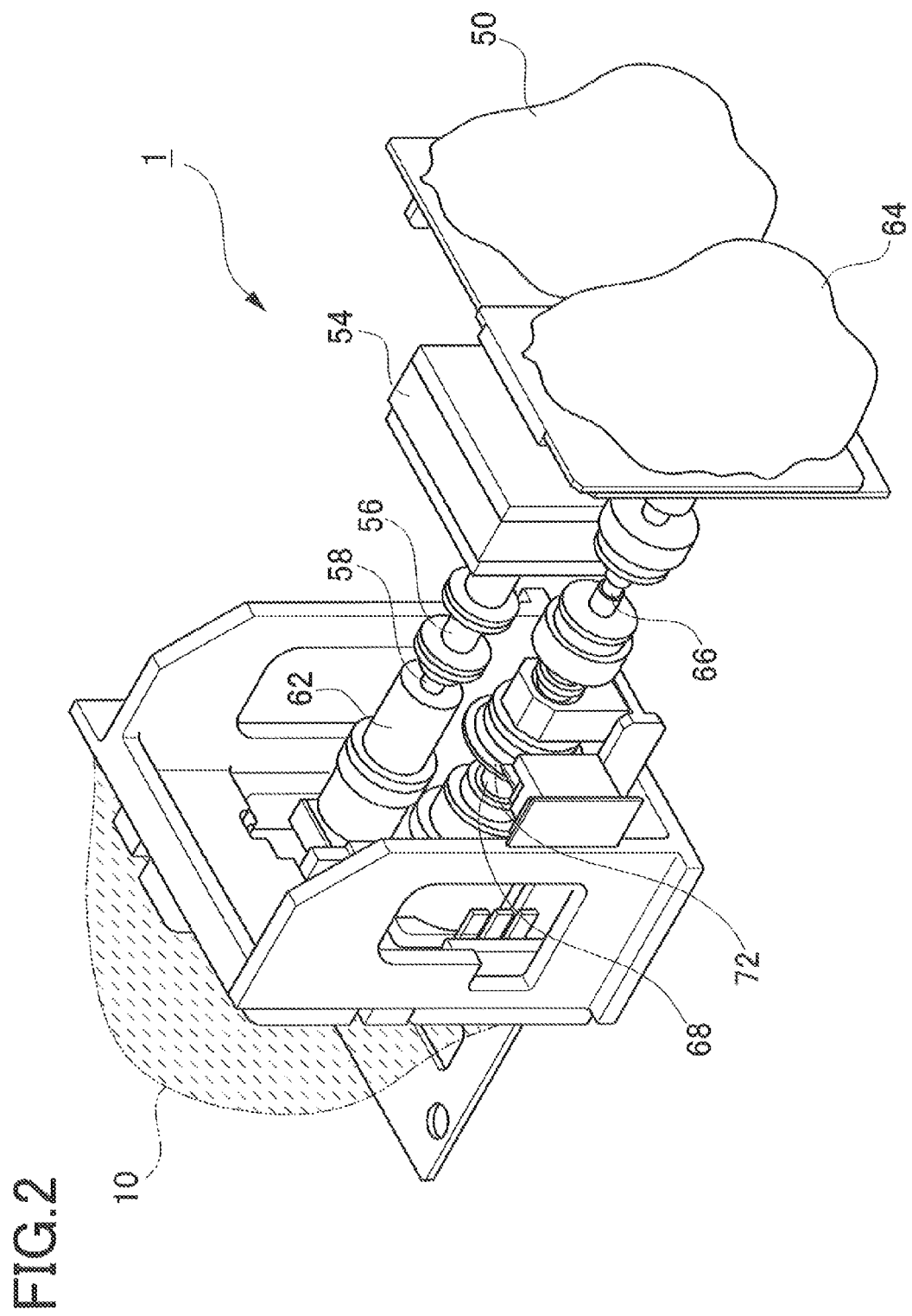
FIG. 2 is an external perspective view of the transmission assembly tester of the present embodiment.
Figure 3:
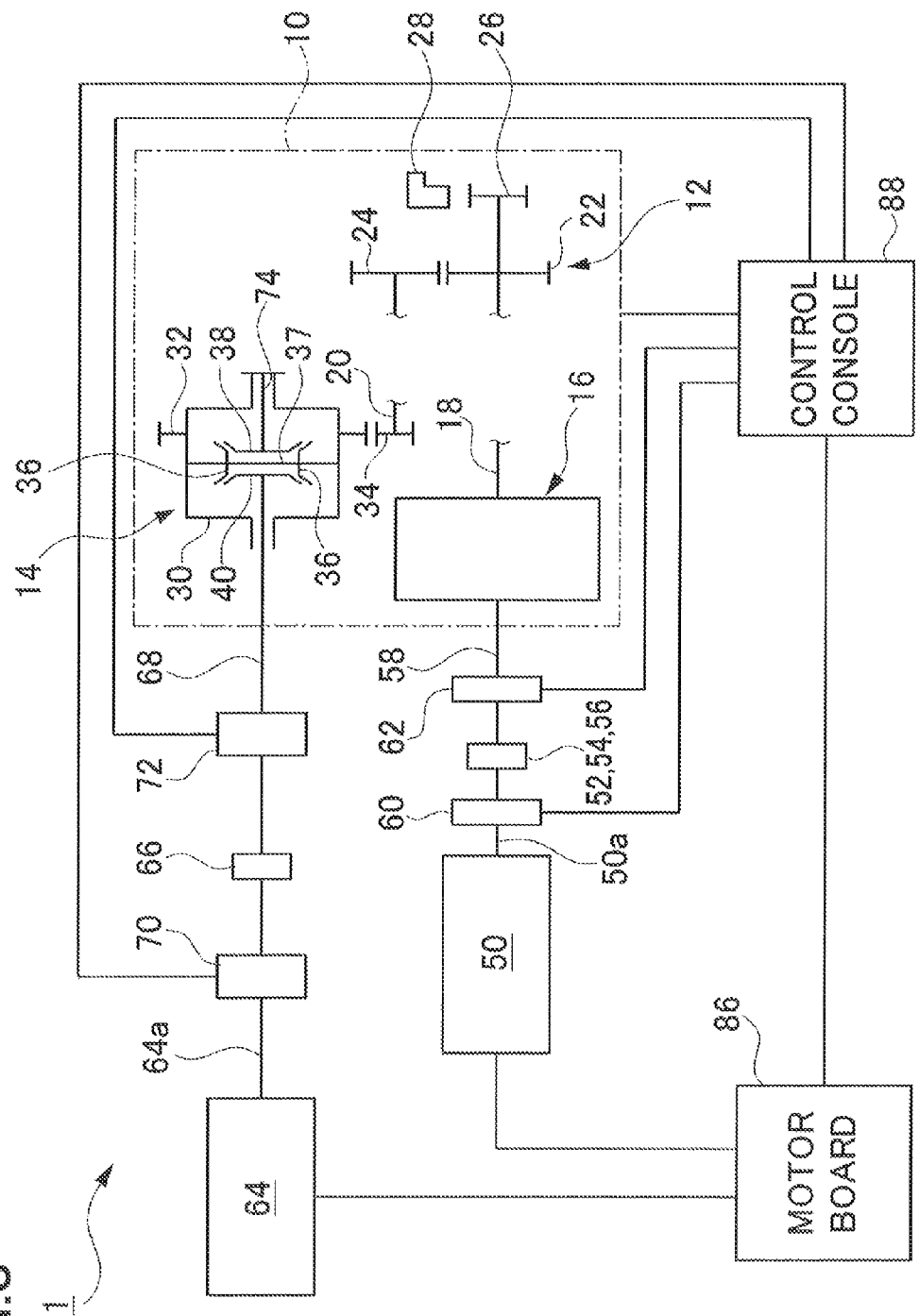
FIG. 3 is a schematic view showing a configuration of the transmission assembly tester and a transmission which is an object to be tested in the present embodiment.
Figure 4:
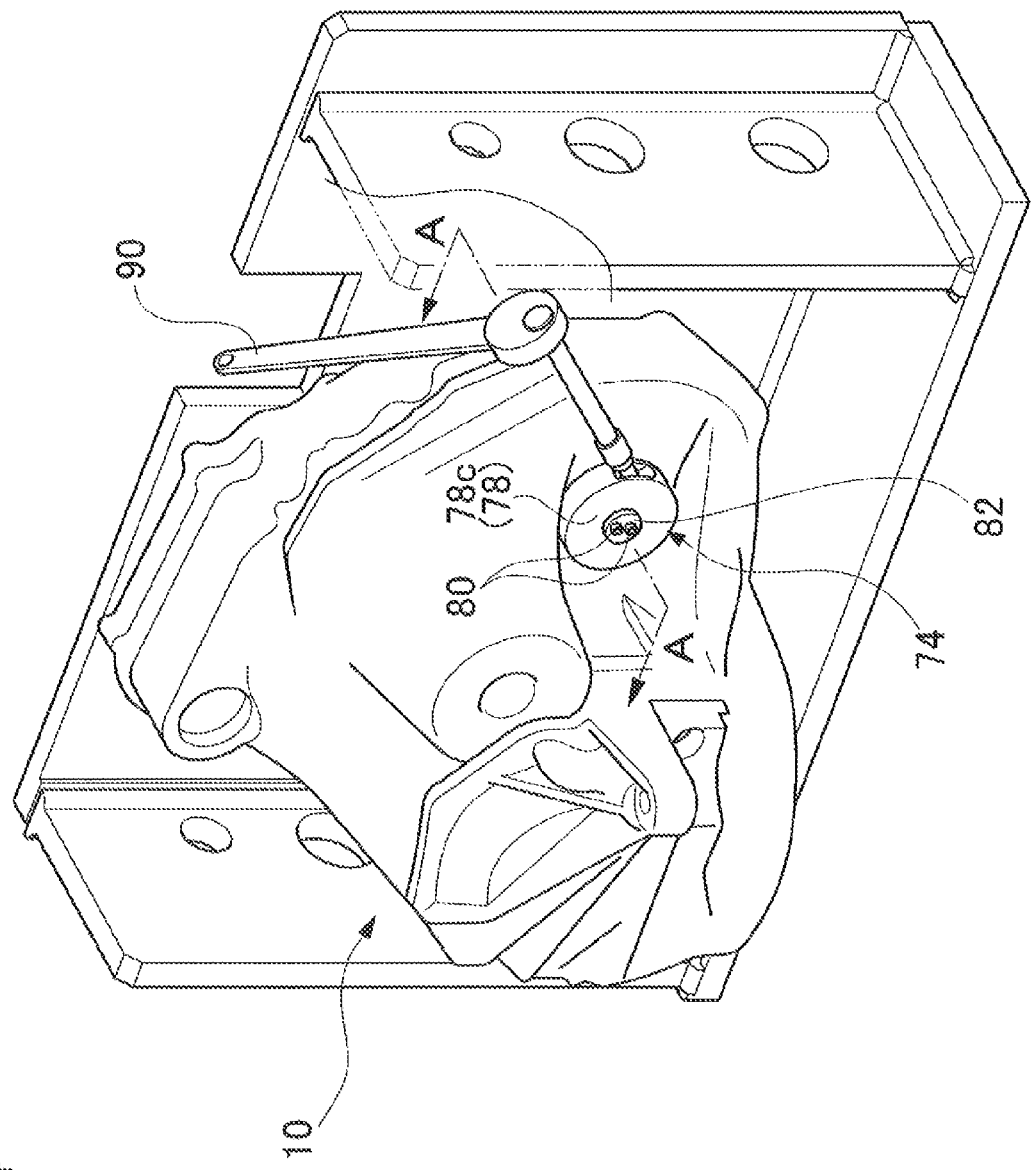
FIG. 4 is an external perspective view of the transmission which is the object to be tested and its surroundings in the transmission assembly tester in the present embodiment.
Figure 5:
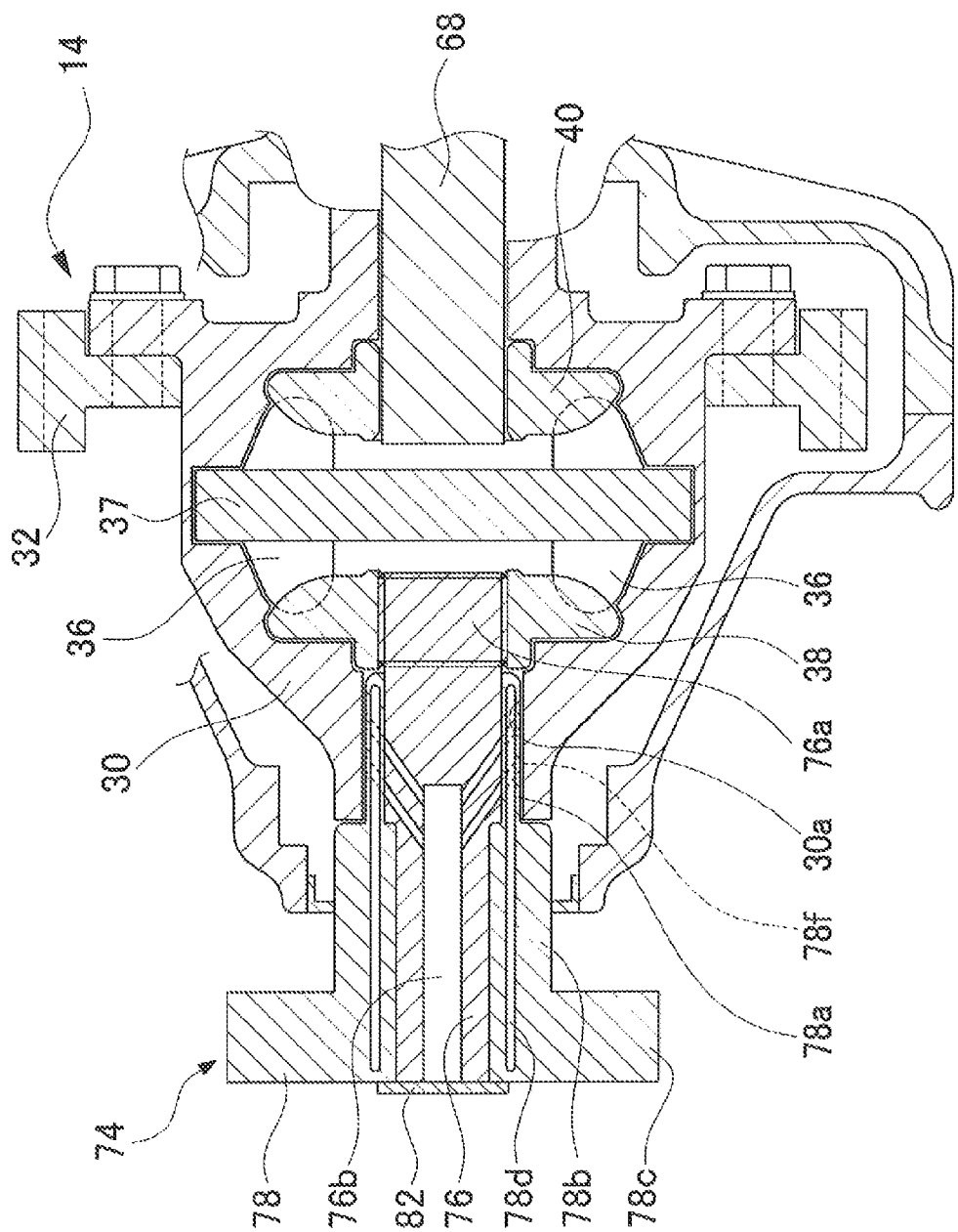
FIG. 5 is a cross sectional view taken along a line A-A in FIG. 4.
Figure 6:
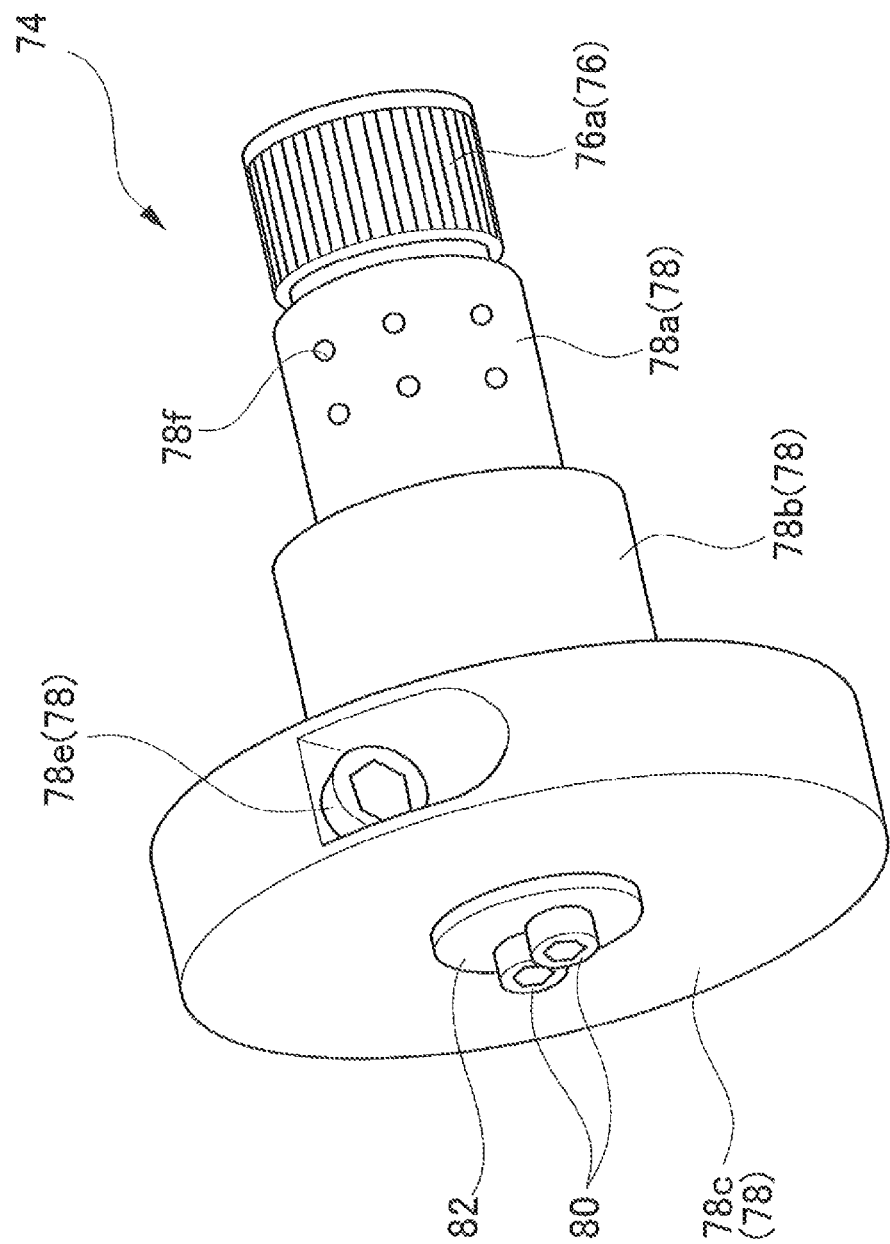
FIG. 6 is an external perspective view of a chuck tool.

A detailed description of a preferred embodiment of the present invention will now be given referring to the accompanying drawings. Herein, FIG. 1 is a plan view of a transmission assembly tester 1 as one example of a transmission testing device of the present invention. FIG. 2 is an external perspective view of the transmission assembly tester 1. FIG. 3 is a schematic view showing a configuration of the transmission assembly tester 1 and a transmission 10 which is an object to be tested (a test object). FIG. 4 is an external perspective view of the transmission 10 which is the test object and its surroundings in the transmission assembly tester 1. FIG. 5 is a cross sectional view taken along a line A-A in FIG. 4. FIG. 6 is an external perspective view of a chuck tool 74. In FIGS. 1 and 2, components such as the chuck tool 74, a motor board 86, and a control console 88 are omitted.

<Configuration of Transmission>

Firstly, a configuration of the transmission 10 as an object to be tested by the transmission assembly tester 1 is briefly explained. The transmission 10 is, as shown in FIG. 3, a transaxle transmission which is provided with a transmission mechanism 12 and a differential gear section 14.

The transmission mechanism 12 includes a torque converter 16, an input shaft 18, a countershaft 20, a counter drive gear 22, a counter driven gear 24, and others.

The torque converter 16 is connected to an output shaft (crank shaft, not shown) of an engine when the transmission 10 is mounted in a vehicle (not shown). Then, the torque converter 16 transmits rotation of the output shaft of the engine to the input shaft 18.

The countershaft 20 is positioned in parallel with the input shaft 18. The counter drive gear 22 is attached to the input shaft 18. The counter driven gear 24 is attached to the countershaft 20. The counter driven gear 24 is meshed with the counter drive gear 22.

Further, to the input shaft 18, a parking gear 26 is attached. In a vicinity of the parking gear 26, a parking pawl 28 is provided. Then, when a gearshift lever (not shown) changes gear to a parking range, the parking pawl 28 moves to be meshed with the parking gear 26.

The differential gear section 14 includes a differential case 30, a ring gear 32, a drive pinion gear 34, pinion gears 36, a pinion shaft 37, a side gear 38, a side gear 40, and others. The side gear 38 is one example of a "first side gear" in the present invention, and the side gear 40 is one example of a "second side gear" in the present invention.

The ring gear 32 is formed around an outer circumference of the differential case 30. The drive pinion gear 34 is attached to the aforementioned countershaft 20. Then, the ring gear 32 and the drive pinion gear 34 are meshed with each other.

The pinion gears 36 are integrally formed with the differential case 30 inside the differential case 30. The pinion shaft 37 supports the two pinion gears 36 in a rotatable manner. The side gear 38 and the side gear 40 are meshed with the pinion gears 36.

<Configuration of Transmission Assembly Tester>

Next, a configuration of the transmission assembly tester 1 is explained. The transmission assembly tester 1 carries out a test for verifying functionality of the transmission 10. This transmission assembly tester 1 includes, as shown in FIGS. 1 to 5, an input shaft motor 50, a coupling 52, a gearbox 54, a coupling 56, an input shaft 58, an input shaft encoder 60, an input shaft torquemeter 62, an output shaft motor 64, a coupling 66, an output shaft 68, an output shaft encoder 70, an output shaft torquemeter 72, a chuck tool 74, the motor board 86, the control console 88, and others. As mentioned, the transmission assembly tester 1 includes the only one output shaft 68 as an output shaft.

A rotary shaft 50a of the input shaft motor 50 is connected to a first end portion of the input shaft 58 via the coupling 52, the gearbox 54, and the coupling 56. Then, a second end portion of the input shaft 58 is connected to the torque converter 16 of the transmission 10 when the test for verifying the functionality of the transmission 10 is carried out.

The input shaft encoder 60 is attached to the rotary shaft 50a of the input shaft motor 50. This input shaft encoder 60 is configured to measure rotation speed (number of rotations per unit of time) of the rotary shaft 50a of the input shaft motor 50, namely, rotation speed of the input shaft 58. The input shaft torquemeter 62 is attached to the input shaft 58. This input shaft torquemeter 62 is configured to measure torque of the input shaft 58.

A rotary shaft 64a of the output shaft motor 64 is connected to a first end portion of the output shaft 68 via the coupling 66. A second end portion of the output shaft 68 is connected to the side gear 40 of the differential gear section 14 as an output part of the transmission 10 when the test for verifying the functionality of the transmission 10 is carried out. In this manner, the output shaft 68 is directly connected to the side gear 40. Then, the output shaft motor 64 drives the output shaft 68 to rotate.

The output shaft encoder 70 is attached to the rotary shaft 64a of the output shaft motor 64. This output shaft encoder 70 is configured to detect rotation speed of the rotary shaft 64a of the output shaft motor 64, namely, rotation speed of the output shaft 68. The output shaft torquemeter 72 is attached to the output shaft 68. This output shaft torquemeter 72 is configured to measure torque of the output shaft 68.

As shown in FIG. 6, the chuck tool 74 has a stepped cylindrical shape. This chuck tool 74 is, as shown in FIGS. 5 and 6, provided with a spline shaft 76, an arbor tube 78, screws 80, a retaining plate 82, and others. The chuck tool 74 is one example of a "meshing unit" of the present invention.

The spline shaft 76 is integrally assembled with the arbor tube 78 by the screws 80 and the retaining plate 82. The spline shaft 76 is formed with a spline part 76a, an air supply passage 76b, and others. The spline part 76a is formed in a distal end portion of the spline shaft 76 opposite to a side on which the screws 80 and the retaining plate 82 are located in a center axis direction (left and right direction in FIG. 5) of the spline shaft 76. This spline part 76a is configured to be meshed with the side gear 38 of the differential gear section 14. The spline part 76a is one example of a "meshing part" in the present invention. The air supply passage 76b is formed inside the spline shaft 76, and the passage 76b is connected to an air supply source (not shown).

The arbor tube 78 includes a chuck part 78a, an intermediate part 78b, a terminal end part 78c, a fluid circuit 78d, a screw 78e, blower holes 78f, and others. The chuck part 78a is formed on a distal end portion of the arbor tube 78 on a side closer to the spline part 76a of the spline shaft 76 in a center axis direction (left and right direction in FIG. 5) of the arbor tube 78. The chuck part 78a may be made of SCM 415 (chromium-molybdenum steel) for example, but it is not particularly limited thereto.

The arbor tube 78 is constituted of the chuck part 78a, the intermediate part 78b, and the terminal end part 78c in this order from the distal end portion to a terminal end portion. Each one of the chuck part 78a, the intermediate part 78b, and the terminal end part 78c is formed in a hollow cylindrical shape. An outer diameter of the chuck part 78a is smaller than an outer diameter of the intermediate part 78b, and the outer diameter of the intermediate part 78b is smaller than an outer diameter of the terminal end part 78c.

The fluid circuit 78d is formed inside the chuck part 78a, the intermediate part 78b, and the terminal end part 78c. Fluid (for example, oil) inside the fluid circuit 78d is applied with pressure by fastening the screw 78e. By applying the pressure to the fluid inside the fluid circuit 78d in this manner, the chuck part 78a is expanded outwardly in a radial direction of the chuck part 78a. Thus, the chuck part 78a holds a journal part 30a which is an inner surface of the differential case 30, so that the chuck tool 74 is fixed to the differential case 30 of the differential gear section 14. A plurality of the blower holes 78f are formed on an entire outer circumferential surface of the chuck part 78a. The blower holes 78f are holes for discharging out air from the air supply passage 76b.

The chuck tool 74 configured as mentioned above is fixed to the differential case 30 in such a way that the spline part 76a of the spline shaft 76 is engaged and meshed with the side gear 38 and that the chuck part 78a of the arbor tube 78 holds on the journal part 30a of the differential case 30. Thereby, the side gear 38 is fixed to the differential case 30 via the chuck tool 74.

The motor board 86 is connected to the input shaft motor 50, the output shaft motor 64, the control console 88, and others. This motor board 86 is provided with a control device such as a programmable logic controller (PLC). The motor board 86 controls driving of the input shaft motor 50 and the output shaft motor 64 so as to control rotation speed of the input shaft 58 and rotation speed of the output shaft 68.

The control console 88 is connected to the input shaft encoder 60, the input shaft torquemeter 62, the output shaft encoder 70, the output shaft torquemeter 72, the air supply source (not shown), the motor board 86, and others. This control console 88 is provided with a control device such as a programmable logic controller (PLC). The control console 88 obtains information of measurement results from the input shaft encoder 60, the input shaft torquemeter 62, the output shaft encoder 70, and the output shaft torquemeter 72. The control console 88 also controls the chuck tool 74 and the air supply source (not shown). Further, the control console 88 can conduct general control of the transmission assembly tester 1 and carries out various controls for testing the functionality of the transmission 10.

<Operation of Transmission Assembly Tester>

As an operation of the transmission assembly tester 1, a testing method of the transmission 10 using the transmission assembly tester 1 is explained.

First, the transmission 10 is attached to the transmission assembly tester 1. At this time, the input shaft 58 is connected to the torque converter 16 of the transmission 10.

Further, the output shaft 68 is connected to the side gear 40 of the differential gear section 14.

Then, the spline part 76a of the spline shaft 76 of the chuck tool 74 is meshed with the side gear 38. Specifically, spline on an outer circumferential surface of the spline part 76a is meshed with spline on an inner circumferential surface of the side gear 38 of the differential gear section 14.

Further, the chuck part 78a of the arbor tube 78 of the chuck tool 74 holds the journal part 30a of the differential case 30. To be specific, the chuck part 78a is inserted inside the journal part 30a of the differential case 30. Then, the air is discharged through the blower holes 78f and blown against the journal part 30a to sweep away the oil adhering to the journal part 30a. This swept oil flows into a groove portion (not shown) formed in the journal part 30a, so that the journal part 30a is cleaned with no adhesion of the oil. In this manner, before the journal part 30a is held by the chuck part 78a, the air is discharged through the blower holes 78f and blown against the journal part 30a to bring the journal part 30a in a cleaned state.

Then, the screw 78e is fastened to apply pressure to the fluid inside the fluid circuit 78d, thereby the chuck part 78a is expanded outwardly in the radial direction of the chuck part 78a. At this time, as shown in FIG. 4, it can be considered that the screw 78e is fastened manually by use of a jig 90. Alternatively, the screw 78e may be fastened automatically. The pressure (for example, oil pressure) applied to the fluid inside the fluid circuit 78d is considered to be set as 350 MPa for example, but the pressure is not particularly limited to this value.

By fastening the screw 78e to apply pressure to the fluid in the fluid circuit 78d, the chuck part 78a is also expanded inwardly in the radial direction of the chuck part 78a. Thereby, the spline shaft 76 and the arbor tube 78 are fixed to each other.

Expanding the chuck part 78a radially outwardly as mentioned above makes the chuck part 78a hold the journal part 30a. In other words, in the present embodiment, the chuck part 78a is not in line contact but is in surface contact with the journal part 30a so that the chuck part 78a holds the journal part 30a. Thus, the chuck tool 74 is fixed to the differential case 30. At the same time when the journal part 30a is held by the chuck part 78a, air may be discharged through the blower holes 78f and blown against the journal part 30a of the differential case 30 to clean the journal part 30a.

Herein, it is evaluated the effect of discharging the air through the blower holes 78f and blowing the air against the journal part 30a so as to clean the journal part 30a. In a case that the journal part 30a is in a cleaned state, holding force of the chuck part 78a to hold the differential case 30 is increased by about 40% compared to a case that the journal part 30a is not cleaned. Consequently, by cleaning the journal part 30a, the holding force of the chuck part 78a to hold the differential case 30 can be increased.

After the transmission 10 is attached to the transmission assembly tester 1 as mentioned above, the test for verifying the functionality of the transmission 10 is carried out.

Herein, a test for verifying functionality of a parking mechanism of the transmission 10 is given as an example. First, the gearshift lever (not shown) of the transmission 10 changes gear to the parking range so that the parking pawl 28 and the parking gear 26 are engaged. Then, the output shaft motor 64 is driven. Since rotation of the input shaft 18 is locked by the engagement of the parking gear 26 and the parking pawl 28, torsional torque is generated in the output shaft 68.

Therefore, quality of the functionality of the parking mechanism is determined by comparing the torque measured by the output shaft torquemeter 72 and a predetermined threshold value. In this way, the test for verifying the functionality of the parking mechanism is carried out.

The test for verifying the functionality of the parking mechanism is given as one example, but the present invention is not limited to such a test. The present invention may also be applied to tests for verifying other functions of the transmission 10.

Further, a method for holding the differential case 30 by the chuck tool 74 may be the manual one or the automatic one. The portion of the differential case 30 held by the chuck tool 74 is not limited to the above mentioned journal part 30a and may be in any portion as long as the differential case 30 is held by the chuck tool 74. Moreover, gaseous body other than the air may be discharged through the blower holes 78f.

As a modified example, it is conceivable that the side gear 40 is fixed to the differential case 30 via the chuck tool 74 and the output shaft 68 is connected to the chuck tool 74 so that the output shaft 68 is indirectly connected to the side gear 40 via the chuck tool 74.

As another modified example, it is conceivable that both the side gear 38 and the side gear 40 are fixed to the differential case 30 via the chuck tool 74. Still another modified example is that the arbor tube 78 is provided as a separate tool from the chuck tool 74.

<Effects of the Present Embodiment>

The present embodiment provides the transmission assembly tester 1 carrying out the test for verifying the functionality of the transmission 10, the tester 1 including: the output shaft 68 directly or indirectly connected to the differential gear section 14 of the transmission 10; the output shaft motor 64 for rotating the output shaft 68; and the cylindrical chuck tool 74 formed with the spline part 76a of the spline shaft 76 to be meshed with the side gear 38 of the differential gear section 14 and the chuck part 78a of the arbor tube 78 formed inside with the fluid circuit 78d. In the present embodiment, the pressure is applied to the fluid (for example, oil) in the fluid circuit 78d to expand the chuck part 78a in the radial direction of the chuck part 78a so that the chuck tool 74 is fixed to the differential case 30 of the differential gear section 14.

Thus, the test for verifying the functionality of the transmission 10 can be carried out with the single output shaft 68 without considering the difference in motion between two output shafts like the prior arts. Hence, one single output shaft motor 64 is sufficient. Accordingly, the test for verifying the functionality of the transmission 10 can be carried out with achieving cost reduction. Further, size reduction in the transmission assembly tester 1 can be realized.

The journal part 30a is held by the chuck part 78a while the chuck part 78a is not in line contact but is in surface contact with the journal part 30a. Thus, the journal part 30a is subjected to almost uniform pressure, so that the journal part 30a is protected. Further, the holding force of the chuck part 78a to hold the differential case 30 is increased, and hence the chuck part 74 is hard to make a slip with the differential case 30.

The differential gear section 14 includes the side gear 38 and the side gear 40. The spline part 76a of the spline shaft 76 of the chuck tool 74 is meshed with the side gear 38 and the output shaft 68 is connected to the side gear 40. Thus, the side gear 38 is fixed to the differential case 30, so that the force input from the input shaft 58 is transmitted one-to-one to the side gear 40. To be more specific, the side gear 38 is fixed to the differential case 30 and the side gear 38 and the ring gear 32 are fixed to each other, leading to the synchronization of rotation of the side gear 38 and the ring gear 32. Namely, the pinion gears 36 transmitting motive power of the ring gear 32 to the side gear 38 do not rotate around the pinion shaft 37 as a rotation axis, and only the pinion shaft 37 itself rotates on its axis. When the ring gear 32 rotates, the side gear 38 and the side gear 40 are synchronized to rotate via the rotation of the pinion shaft 37. Accordingly, there is no difference in motion between the side gear 38 and the side gear 40. Therefore, the transmission 10 can be driven only by the single output shaft motor 64, and the test for verifying the functionality of the transmission 10 is carried out with surely achieving cost reduction.

The chuck tool 74 is formed on the outer circumferential surface of the chuck part 78a with the blower holes 78f for discharging the air outside. Thus, gas is discharged through the blower holes 78f so that the oil adhering to the differential case 30 is blown away. Accordingly, the chuck tool 74 is hard to make a slip with the differential case 30.

Further, before the journal part 30a is held by the chuck part 78a or when the journal part 30a is held by the chuck part 78a, the air is discharged through the blower holes 78f and blown against the journal part 30a, so that the oil adhering to the journal part 30a can be swept away. Thus, the journal part 30a can be surely held by the chuck part 78a and the chuck tool 74 can be surely fixed to the differential case 30.

The above mentioned embodiment is only an exemplification and does not limit any subject matter of the present invention. The above embodiment may be applied with various changes and modifications without departing from the scope of its subject matter.

REFERENCE SIGNS LIST

1 Transmission assembly tester
10 Transmission
12 Transmission mechanism
14 Differential gear section
16 Torque converter
18 Input shaft
20 Countershaft
22 Counter drive gear
24 Counter driven gear
26 Parking gear
28 Parking pawl
30 Differential case
30a Journal part
32 Ring gear
34 Drive pinion gear
36 Pinion gear
37 Pinion shaft
38 Side gear
40 Side gear
50 Input shaft motor
50a Rotary shaft
52 Coupling
54 Gearbox
56 Coupling
58 Input shaft
60 Input shaft encoder
62 Input shaft torquemeter
64 Output shaft motor
64a Rotary shaft
66 Coupling
68 Output shaft
70 Output shaft encoder
72 Output shaft torquemeter
74 Chuck tool
76 Spline shaft
76a Spline part
76b Air supply passage
78 Arbor tube
78a Chuck part
78b Intermediate part
78c Terminal end part
78d Fluid circuit
78e Screw
78f Blower hole
80 Screw
82 Retaining plate
86 Motor board
88 Control console
90 Jig

The invention claimed is:

1. A transmission testing device for carrying out a test for verifying functionality of a transmission, wherein
the transmission testing device includes:
an output shaft configured to be directly or indirectly connected to a differential gear section of the transmission;
a rotation driving unit for rotating the output shaft; and
a cylindrical meshing unit including a meshing part configured to be meshed with a side gear of the differential gear section and a chuck part formed inside with a fluid circuit, and
the meshing unit is fixed to a differential case of the differential gear section in such a way that the chuck part is expanded in a radial direction of the chuck part when pressure is applied to a fluid in the fluid circuit.

2. The transmission testing device according to claim 1, wherein
the differential gear section includes a first side gear and a second side gear,
the meshing part is meshed with the first side gear, and
the output shaft is connected to the second side gear.

3. The transmission testing device according to claim 1, wherein the meshing unit is formed on an outer circumferential surface of the chuck part with a blower hole for discharging gas.

4. The transmission testing device according to claim 3, wherein
the chuck part will hold an inner surface of the differential case when the chuck part is expanded in the radial direction of the chuck part, and
the gas is discharged through the blower hole and blown against the inner surface of the differential case before the chuck part holds the inner surface of the differential case or when the chuck part holds the inner surface of the differential case.

5. A transmission testing method of carrying out a test for verifying functionality of a transmission, wherein
the testing method employs:
an output shaft configured to be directly or indirectly connected to a differential gear section of the transmission;
a rotation driving unit for rotating the output shaft; and
a cylindrical meshing unit including a meshing part configured to be meshed with a side gear of the differential gear section and a chuck part formed inside with a fluid circuit, and
the method includes fixing the meshing unit to a differential case of the differential gear section by applying pressure to a fluid in the fluid circuit so that the chuck part is expanded in a radial direction of the chuck part.

6. The transmission testing method according to claim 5, wherein
the differential gear section includes a first side gear and a second side gear,
the meshing part is meshed with the first side gear, and the output shaft is connected to the second side gear.

7. The transmission testing method according to claim 5, wherein the meshing unit is formed on an outer circumferential surface of the chuck part with a blower hole for discharging gas.

8. The transmission testing method according to claim 7, wherein
the chuck part will hold an inner surface of the differential case when the chuck part is expanded in the radial direction of the chuck part, and
the gas is discharged through the blower hole and blown against the inner surface of the differential case before the chuck part holds the inner surface of the differential case or when the chuck part holds the inner surface of the differential case.

* * * * *